United States Patent [19]
Shin

[11] Patent Number: 5,849,182
[45] Date of Patent: Dec. 15, 1998

[54] FILTER FOR A WASHING MACHINE

[75] Inventor: Jung-soo Shin, Suwon, Rep. of Korea

[73] Assignee: Samsung Electronics Co., Ltd., Suwon, Rep. of Korea

[21] Appl. No.: 28,670

[22] Filed: Feb. 24, 1998

[30] Foreign Application Priority Data

Aug. 16, 1997 [KR] Rep. of Korea .................. 1997-39039
Aug. 16, 1997 [KR] Rep. of Korea .................. 1997-39043
Aug. 16, 1997 [KR] Rep. of Korea .................. 1997-39046

[51] Int. Cl.$^6$ ......................... D06F 39/10; B01D 35/143; B01D 35/30; B01D 35/153
[52] U.S. Cl. ............................ 210/167; 210/94; 210/238; 210/346; 210/136; 68/18 F
[58] Field of Search .............................. 210/94, 167, 238, 210/346, 136, 196; 68/18 F

[56] References Cited

U.S. PATENT DOCUMENTS

| | | |
|---|---|---|
| 2,939,305 | 6/1960 | Snyder . |
| 3,626,728 | 12/1971 | Traube . |
| 4,658,605 | 4/1987 | Yanagihara . |
| 5,509,283 | 4/1996 | Lee . |
| 5,661,989 | 9/1997 | Jeon . |

FOREIGN PATENT DOCUMENTS

| | | |
|---|---|---|
| 62-14896 | 1/1987 | Japan . |
| 1-230394 | 9/1989 | Japan . |
| 3-103296 | 4/1991 | Japan . |
| 4-285595 | 10/1992 | Japan . |

*Primary Examiner*—Thomas M. Lithgow
*Attorney, Agent, or Firm*—Burns, Doane, Swecker & Mathis, L.L.P.

[57] ABSTRACT

A filter for a washing machine is disclosed. The filter includes a filter case attached to an inner lower portion of a dehydrating tub of the washing machine for forming a predetermined space with the dehydrating tub, including an attachment portion for being attached to the dehydrating tub and a filter receiving portion formed with an opening portion, and a pocket type filter including a front panel attached with a mesh net to one side thereof for filtering fluff intermingled in the washing water, a rear panel for forming a predetermined space with the front panel by being coupled to the front panel by means of a hinge shaft to be opened/closed while being attached with a mesh net for filtering the fluff intermingled in the washing water to one side thereof, and a check valve fixed to the lower side of the rear panel for confining the flow of the washing water introduced into the space between the front panel and the rear panel, the pocket type filter being inserted into the filter receiving portion and being made of a transparent material. Since the front panel of the pocket type filter is made of a transparent material and the pocket type filter is revealed without screening by the filter case, it is possible to measure the amount of the fluff accumulated within the pocket type filter without separating the pocket type filter from the filter case.

7 Claims, 7 Drawing Sheets

FILTER FOR A WASHING MACHINE

RELATED INVENTION

This invention is related to inventions disclosed in commonly filed U.S. Ser. Nos. 09/028,522, 09/028,523, 09/028,526, 09/028,354, and 09/028,668, the disclosures of which are incorporated by reference herein.

BACKGROUND OF THE INVENTION

1. Field of the Invention

The present invention relates to a washing machine, and more particularly to a filter for a washing machine for filtering foreign matters such as fluff from washing water.

2. Description of the Prior Art

Figure 1:
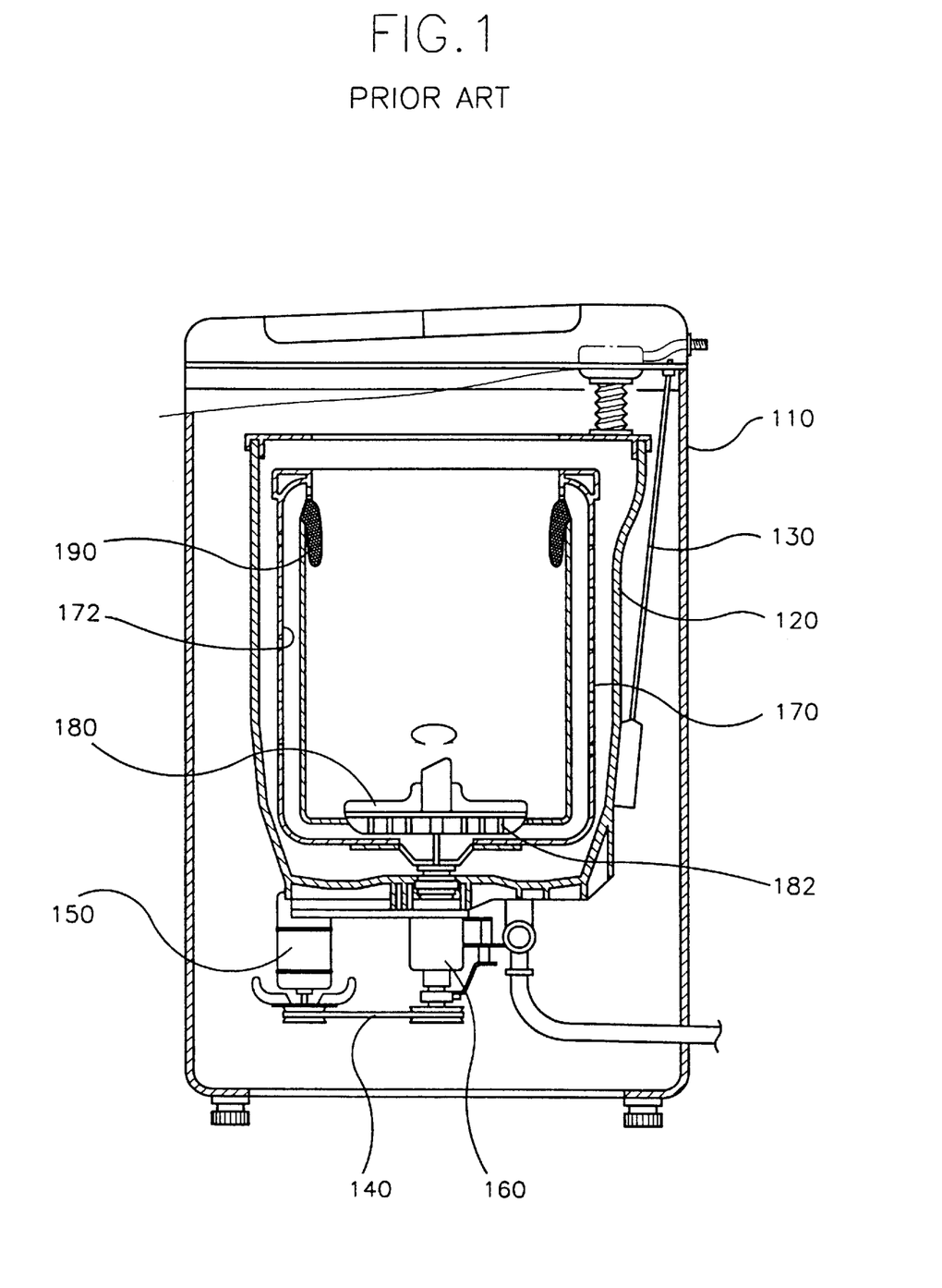
FIG. 1 is a sectional view showing a general full automatic washing machine having a filter.

FIG. 1 illustrates a conventional washing machine. Referring to FIG. 1, in the conventional washing machine, a washing tub 120 is suspended by a suspension 130 into inside of a case 110.

A dehydrating tub 170 and a pulsator (or an agitator, hereinafter refer to "a pulsator") 180 selectively driven by a clutch assembly 160 which is connected to a motor 150 by means of a belt 140, are disposed in the inner side of washing tub 120.

An impeller 182 as a pump is integrally formed to the lower side of pulsator 180, and a filter 190 is provided around the upper end of dehydrating tub 170. A guide portion 172 for guiding the washing water pumped by impeller 182 toward filter 190 is formed between impeller 182 and filter 190.

In the washing machine constructed as above, once pulsator 180 is rotated by motor 150 and clutch assembly 160 during a washing or rinsing cycle, the washing water pumped by impeller 182 at the lower portion of pulsator 180 is guided to filter 190 along guide portion 172 to be dropped into the interior of dehydrating tub 170 via filter 190. During this process, foreign matters intermingled in the washing water are filtered by filter 190.

However, according to the conventional washing machine constructed as above, filter 190 is arranged around the upper end of dehydrating tub 170. For this reason, when a small amount of articles is washed in a small quantity of cleaning water, the washing water cannot reach filter 190. That is, the foreign matters intermingled in the washing water cannot be sufficiently filtered by filter 190 to lower washing efficiency.

Figure 2:
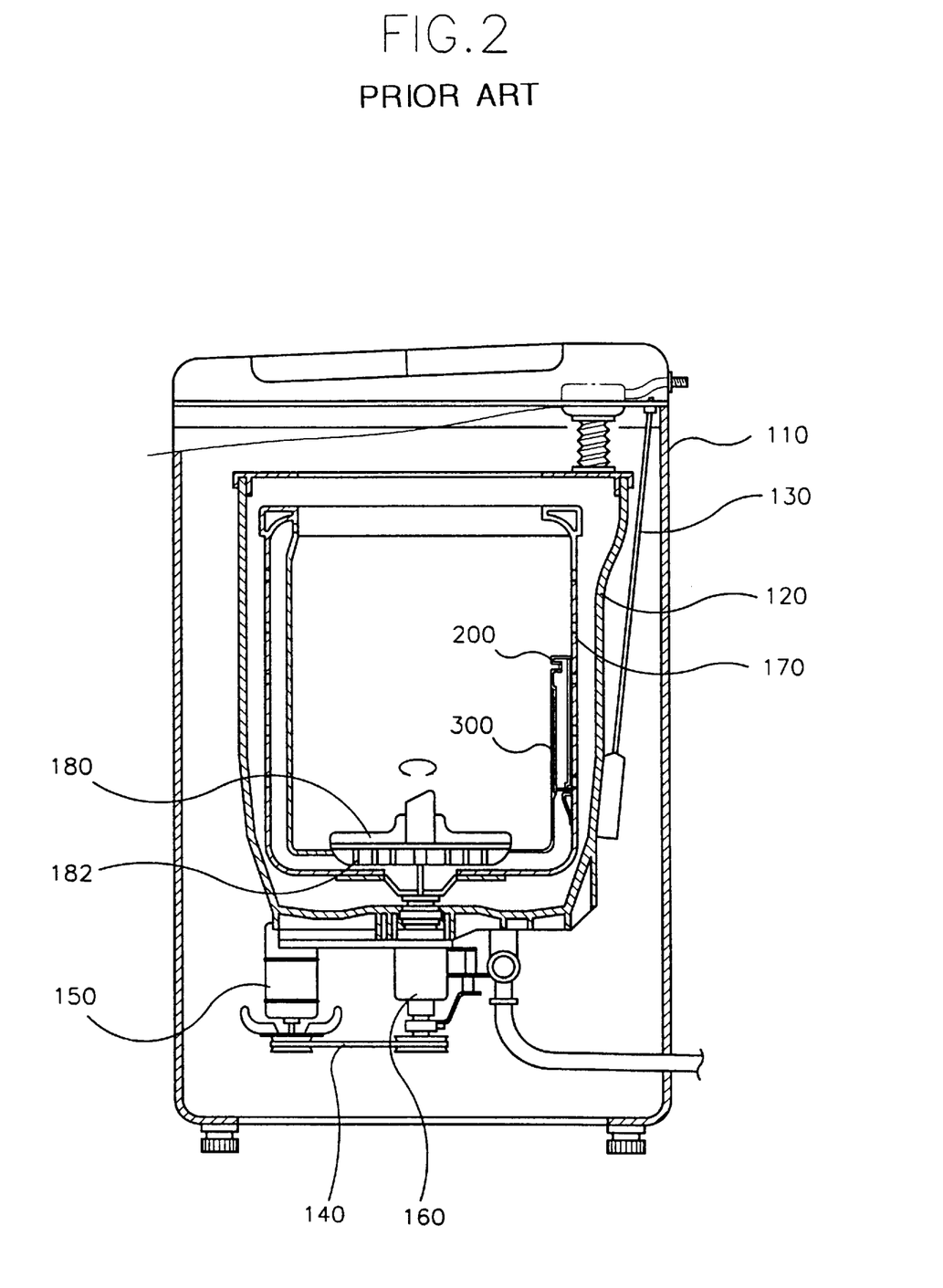
FIG. 2 is a sectional view showing other general full automatic washing machine having a filter.
Figure 3:
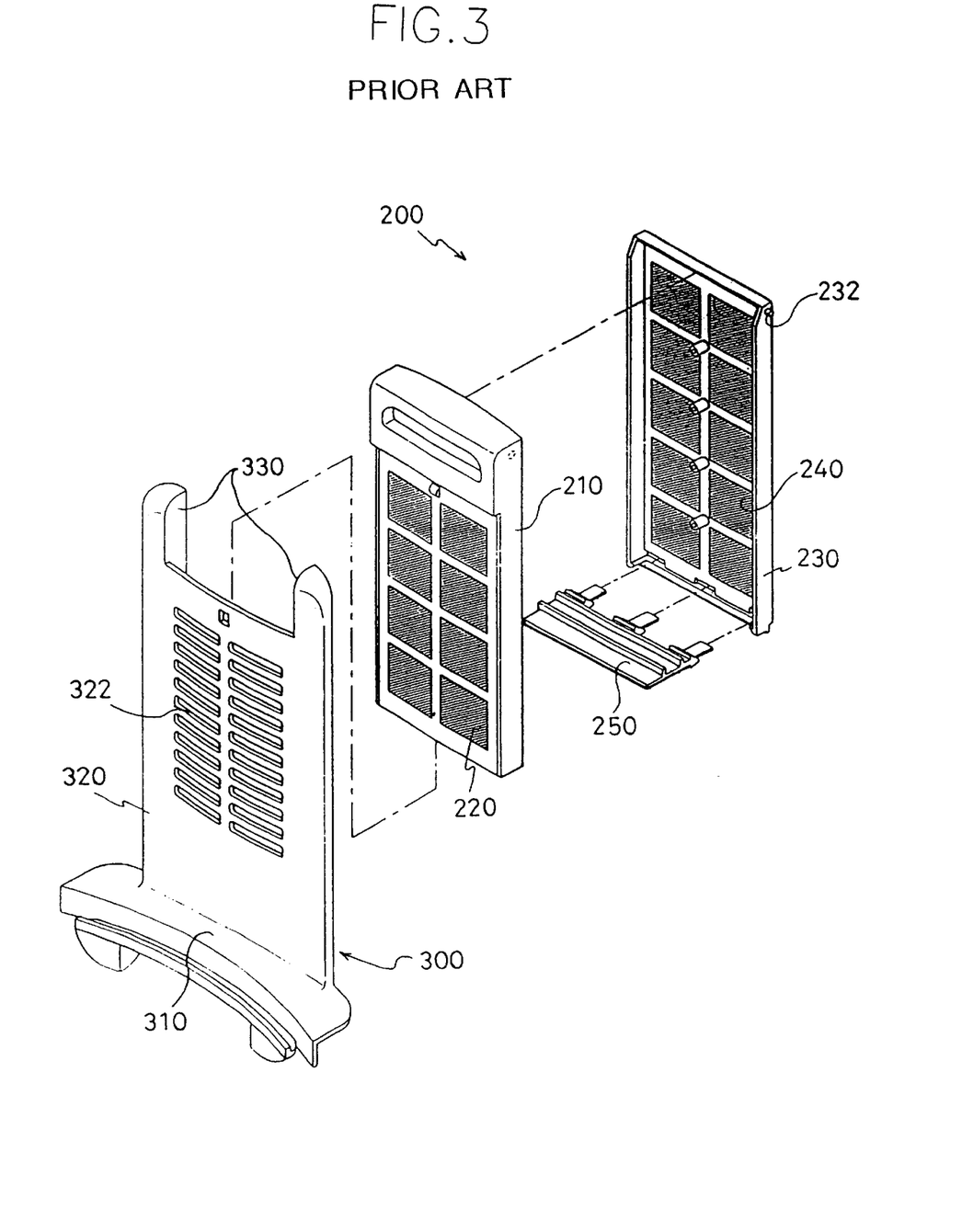
FIG. 3 is an exploded perspective view of the filter shown in FIG. 2.
Figure 4:
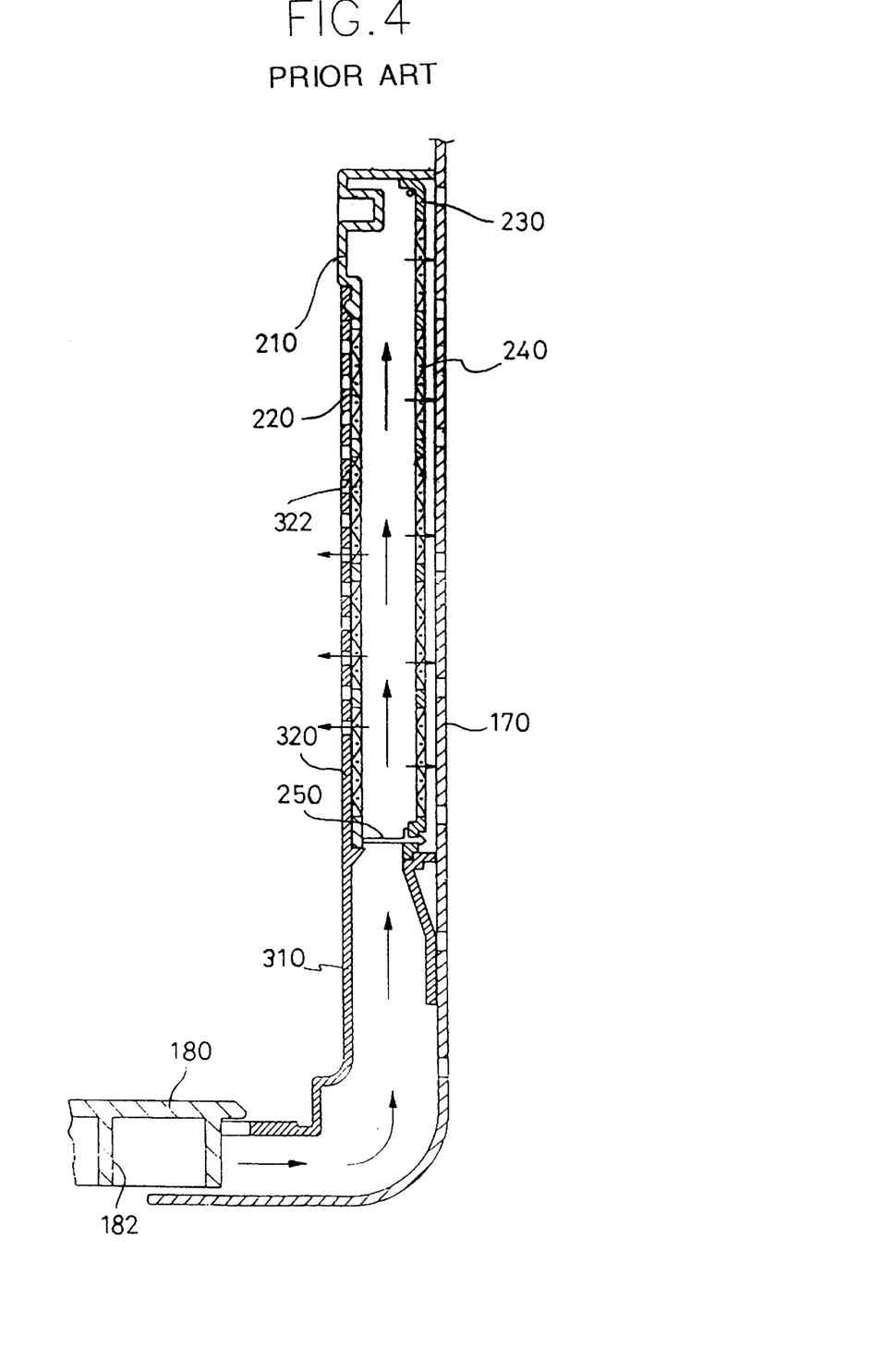
FIG. 4 is a detailed sectional view showing the portion shown in FIG. 2 where the filter for a washing machine is mounted.

FIGS. 2 to 4 show other example of a filter for a washing machine proposed to overcome the above described problems as a example.

As illustrated, the filter for a washing machine is attached to the inner lower portion of dehydrating tub 170, which includes a filter case 300 and a pocket type filter 200 for filtering fluff by being inserted into filter case 300.

Filter case 300 is attached to the inner lower portion of dehydrating tub 170 to form a predetermined space with dehydrating tub 170, which includes an attachment portion 310 for attaching itself onto dehydrating tub 170, a front plane portion 320 formed with a plurality of discharging holes 322 and inserting guide portions 330 formed to both rear sides of front plane portion 320 while having the upper portion opened.

Pocket type filter 200 includes a front panel 210, a rear panel 230 and a check valve 250. Front panel 210 and rear panel 230 are coupled to be opened/closed by a hinge shaft 232 formed to rear panel 230, and attached with mesh nets 220 and 240 for filtering the fluff. Check valve 250 for opening/closing the space between front panel 210 and rear panel 230, is fixed to the lower side of rear panel 230 and made of a material such as a rubber.

Pocket type filter 200 as described above is inserted into the interior of the space between filter case 300 and dehydrating tub 170 by being slidably moved along inserting guide portions 330 from the upper portion of inserting guide portions 330 of filter case 300.

According to the filter as described above, the washing water pumped by impeller 182 flows into pocket type filter 200 via the space between dehydrating tub 170 and filter case 300 during the washing or rinsing cycle. Check valve 250 is upwardly pushed away by means of the washing water thereby the washing water is introduced into the interior of pocket type filter 200.

The washing water introduced into inside of pocket type filter 200 is discharged into dehydrating tub 170 via mesh nets 220 and 240 of front panel 210 and rear panel 230. At this time, the fluff within the washing water is filtered by mesh nets 220 and 240 attached to the front panel 210 and rear panel 230. Also, the washing water exhausted out of pocket type filter 200 is discharged into the interior of dehydrating tub 170 via discharging holes 322 formed in front plane portion 320 of filter case 300.

Under the state that the rotation of a pulsator is stopped after completing the washing or rinsing cycle, check valve 250 returns to its original position by means of gravity. Consequently, the filtered fluff is accumulated into the interior of pocket type filter 200 without getting away from pocket type filter 200.

The fluff accumulated on the interior of pocket type filter 200 is closely attached toward rear panel 230 due to a centrifugal force exerting upon the fluff by dehydrating tub 170 which is rotated at high speed during a dehydrating cycle. By doing so, the washing water pumped by impeller 182 can be easily introduced into pocket type filter 200 during the initial period of the next washing or rinsing cycle.

Filter case 300 is attached to the inner lower portion of a dehydrating tub 170 to form a predetermined space with dehydrating tub 170, which includes an attachment portion 310 for attaching itself onto dehydrating tub 170, a front plane portion 320 formed with a plurality of discharging holes 322 and inserting guide portions 330 formed to both rear sides of front plane portion 320 while having the upper portion opened.

Meanwhile, as the amount of the fluff accumulated within pocket type filter 200 is increased, the fluff is removed from pocket type filter 200 by separating pocket type filter 200 from filter case 300 and opening pocket type filter 200.

However, according to the other filter for a washing machine constructed as described above, since pocket type filter 200 is almost inserted into the interior space between filter case 300 and dehydrating tub 170, it is difficult to measure the amount of the fluff accumulated within pocket type filter 200. Thus, there is a drawback that user should separate pocket type filter 200 from filter case 300 and measure the amount of the fluff.

Moreover, if the amount of the accumulated fluff is carelessly measured by reason of inconvenience, the washing machine is often driven in a state that pocket type filter 200 is fulled with the fluff. By doing so, there are disadvantages that check valve 250 is malfunctioned due to the fluff in pocket type filter 200, and then the capability of accumulating the fluff of pocket type filter 200 and the washing efficiency of a washing machine are decreased.

According to the other example of the prior art, since pocket type filter 200 is inserted into the space between filter case 300 and dehydrating tub 170 as it is, pocket type filter 200 can be separated from filter case 300 caused by the rotation and vibration of dehydrating tub 170 by the rotation of pulsator 180 and the collision of the laundry by the washing water during the washing cycle.

SUMMARY OF THE INVENTION

Therefore, it is an object of the present invention to provide a filter for a washing machine capable of easily measuring the amount of fluff accumulated within a pocket type filter without separating the pocket type filter from a filter case.

It is other object of the present invention to provide a filter for a washing machine for preventing a pocket type filter from releasing from a filter case by exterior forces.

To achieve the object, the present invention provides a filter for a washing machine comprising a filter case attached to an inner lower portion of a dehydrating tub of the washing machine for forming a predetermined space with the dehydrating tub, including an attachment portion for being attached to the dehydrating tub and a filter receiving portion formed with an opening portion; and a pocket type filter including a front panel attached with a mesh net to one side thereof for filtering fluff intermingled in the washing water, a rear panel for forming a predetermined space with the front panel by being coupled to the front panel by means of a hinge shaft to be opened/closed while being attached with a mesh net for filtering the fluff intermingled in the washing water to one side thereof, and a check valve fixed to the lower side of the rear panel for confining the flow of the washing water introduced into the space between the front panel and the rear panel, the pocket type filter being inserted into the filter receiving portion and being made of a transparent material.

According a feature of the present invention, the pocket type filter includes a display for displaying an amount of the fluff which is accumulated therein. The display preferably has a protrusion which is protruded from an inner side of the front panel to an inner side of the rear panel and/or from an inner side of the rear panel to an inner side of the front panel to be contact respectively therewith.

To achieve the other object, the present invention provides a filter for a washing machine comprising a filter case attached to an inner lower portion of a dehydrating tub of the washing machine for forming a predetermined space with the dehydrating tub, including an attachment portion for being attached to the dehydrating tub and a filter receiving portion formed with an opening portion, and a pocket type filter inserted into the filter receiving portion including a front panel attached with a mesh net to one side thereof for filtering fluff intermingled in the washing water, a rear panel for forming a predetermined space with the front panel by being coupled to the front panel by means of a hinge shaft to be opened/closed while being attached with a mesh net for filtering the fluff intermingled in the washing water to one side thereof, a check valve fixed to the lower side of the rear panel for confining the flow of the washing water introduced into the space between the front panel and the rear panel, and a locking part for preventing the pocket type filter from releasing from the filter receiving portion.

Preferably, the locking part has a push plate being formed at an upper end of the front panel and having an elasticity, and a locking protrusion being formed at an upper side of the push plate and locked to a locking jaw which is formed at an upper end of the filter receiving portion.

Moreover, the filter receiving portion is preferably provided with an aperture formed at the upper end of the filter receiving portion, then a finger pressing the push plate is inserted into the aperture.

According to the present invention as described above, since the front panel of the pocket type filter is made of a transparent material and is not screened by the filter case but revealed, the amount of the fluff accumulated within interior of the pocket type filter can be measured without separating the pocket type filter from the filter case. Moreover, the measure of the amount of the fluff which is closely attached toward the rear panel due to a centrifugal force by rotation of the dehydrating tub during a dehydrating cycle, and accumulated while covers the display, is very easy through the display formed in the interior of the pocket type filter.

Since the pocket type filter is secured in the filter receiving portion by the locking part which is formed at the upper end of the front panel when the pocket type filter is inserted into the filter receiving portion of the filter case, the pocket type filter is prevented from separating from the filter case by the exterior forces such as the vibration and rotation of the dehydrating tub by the rotation of the pulsator and the collision of the laundry due to the vibration and rotation of the dehydrating tub.

BRIEF DESCRIPTION OF THE DRAWINGS

The above objects and other advantages of the present invention will become more apparent by describing in detail preferred embodiments thereof with reference to the attached drawings in which.

DETAILED DESCRIPTION OF THE PREFERRED EMBODIMENTS

Figure 5:
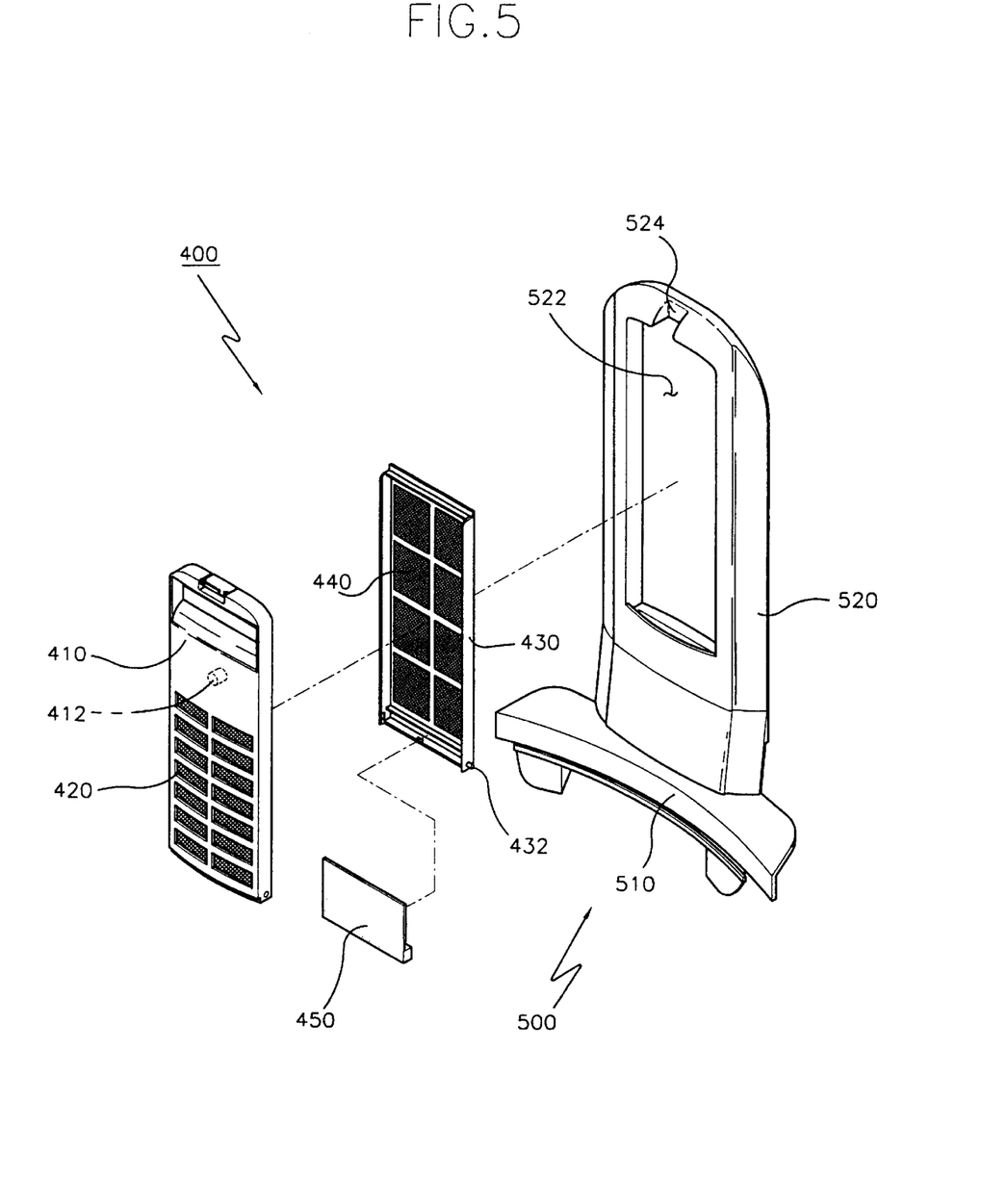
FIG. 5 is an exploded perspective view showing a filter for a washing machine according to the present invention.
Figure 6:
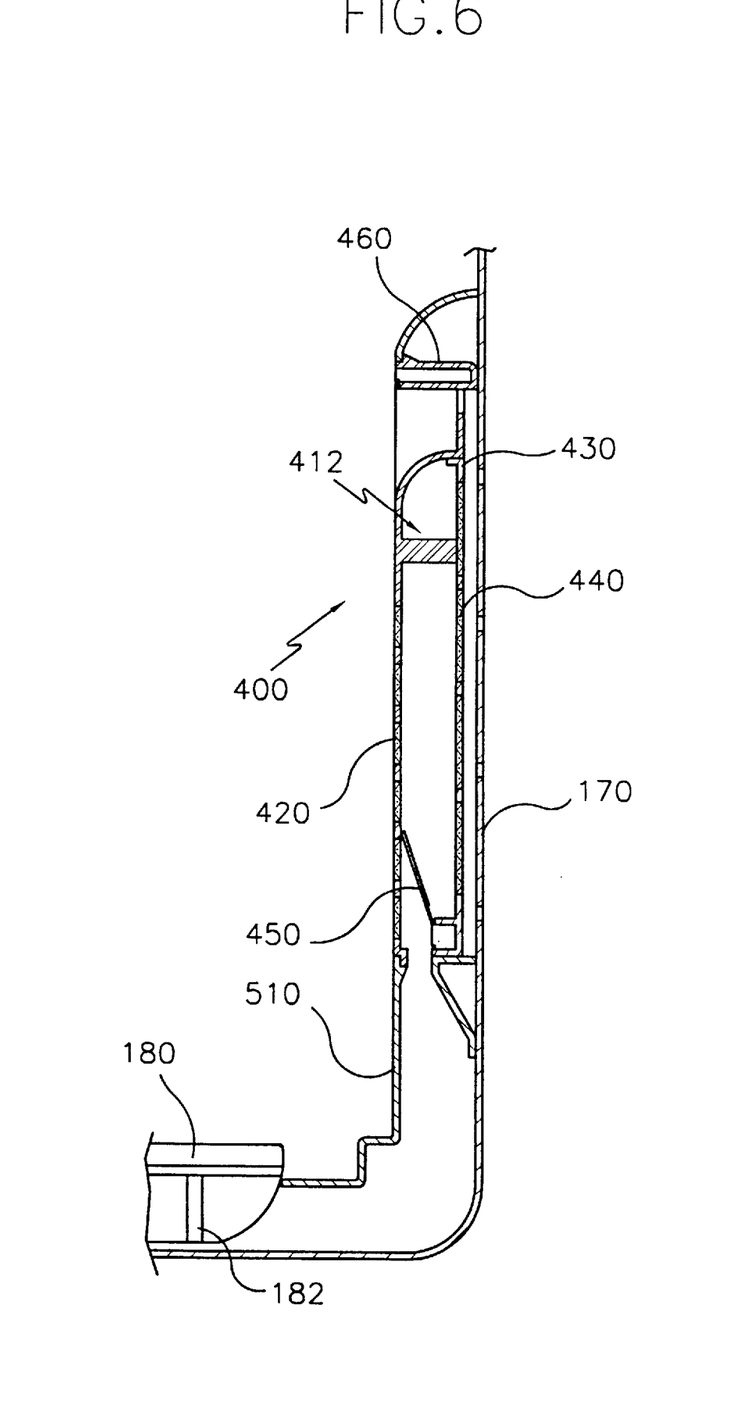
FIG. 6 is a sectional view showing a state that the filter for a washing machine according to the present invention attached to a washing machine.
Figure 7:
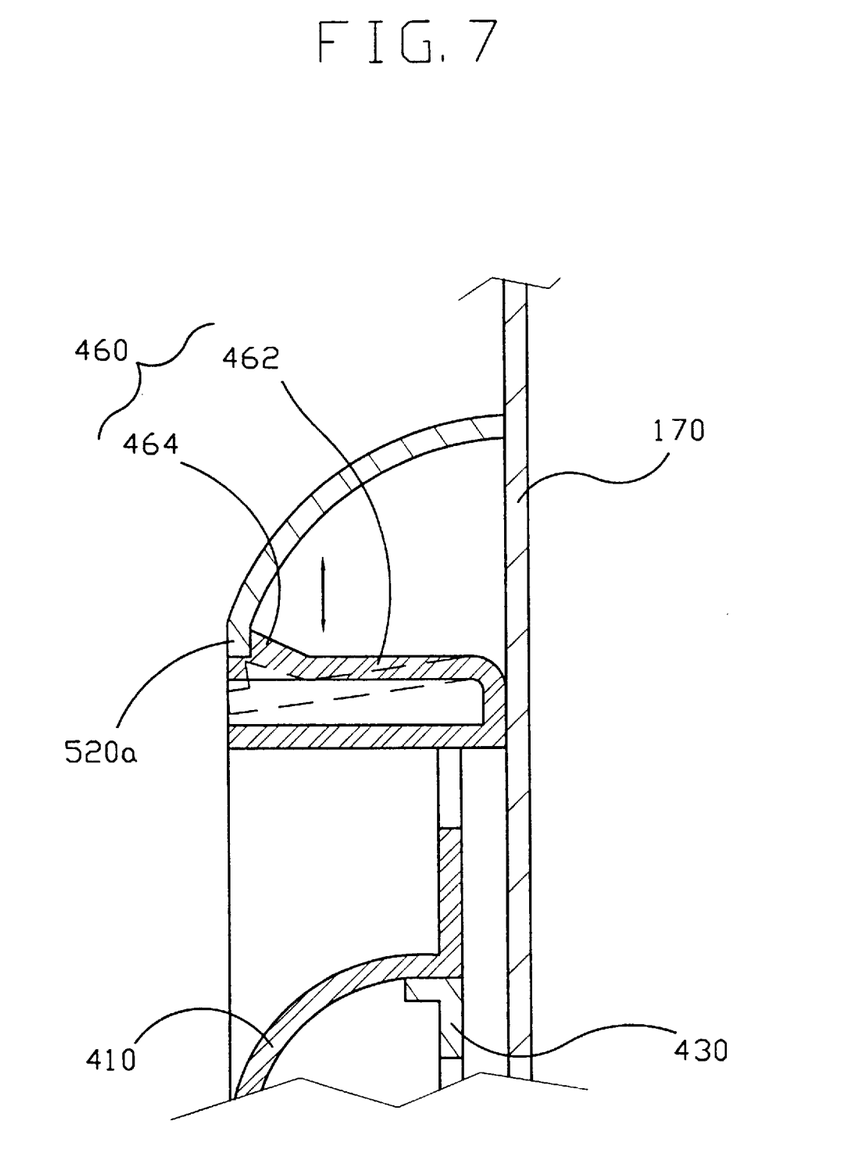
FIG. 7 is an enlarged sectional view showing a locking part as a main element of the filter for a washing machine.

A filter according to a preferred embodiment of the present invention is shown in FIGS. 5 to 7.

As illustrated in the figures, a filter for a washing machine according to the present invention is attached to the inner lower portion of a dehydrating tub 170, which includes a filter case 500 and a pocket type filter 400 for filtering fluff by being inserted into filter case 500.

Filter case 500 includes an attachment portion 510 for attaching itself onto dehydrating tub 170, and a filter receiving portion 520 formed with an opening 522 into which pocket type filter 400 is inserted.

Pocket type filter 400 includes a front panel 410, a rear panel 430 and a check valve 450. Front panel 410 and rear panel 430 are coupled to be opened/closed by a hinge shaft 432 formed to rear panel 430, and attached with mesh nets 420 and 440 for filtering the fluff.

Moreover, front panel 410 is made of a transparent material and has a display 412 for displaying an amount of the fluff accumulated within the interior of pocket type filter 400. Display 412 has a protrudes shape such that is protruded from an inner side of front panel 410 to an inner side of rear panel 430 to be contact therewith.

As enlarged illustrated in FIG. 7, front panel 410 includes a locking part 460 for preventing pocket type filter 400 from release from filter receiving portion 520 of filter case 500. Locking part 460 includes a push plate 462 and locking protrusions 464 formed at both upper sides of push plate 462.

Check valve 450 for opening/closing the space between front panel 410 and rear panel 430, is fixed to the lower side of rear panel 430 and made of a material such as a rubber.

Pocket type filter 400 as described above is accommodated within filter receiving portion 520 by being inserted into opening portion 522 of filter receiving portion 520 from preceding side of filter case 500. At this time, locking protrusions 464 of locking part 460 formed at upper side of front panel 410 are locked by locking jaws 520a which form upper ends of opening portion 522, then pocket type filter 400 is secured to filter receiving portion 520 of filter case 500.

When user intends to separate pocket type filter 400 from filter receiving portion 520, user pushes push plate 462 of locking part 460 in order to release locking protrusions 464 from locking jaws 520a of filter receiving portion 520 and pulls pocket type filter 400.

Meanwhile, an aperture 524 is formed at the upper side of filter receiving portion 520 so that a finger of user can be inserted thereinto. Aperture 524 makes pocket type filter 400 be easily inserted into filter receiving portion 520 and release therefrom.

Since the operation of the filter for a washing machine according to the present invention is same to the operation of the other example of the prior art, the description of the operation is abbreviated.

According to the present invention as described above, pocket type filter 400 is inserted into filter receiving portion 520 of filter case 500 from the preceding side thereof so that front panel 410 of pocket type filter 400 is not screened by filter case 500 but revealed. Moreover, since front panel 410 of pocket type filter 400 is made of a transparent material, the amount of the fluff accumulated within interior of pocket type filter 400 can be measured without separating pocket type filter 400 from filter case 500.

In addition, the fluff is closely attached toward rear panel 430 due to a centrifugal force by dehydrating tub 170 which is rotated during a dehydrating cycle, and accumulated while covers display 412. By doing so, the amount of the fluff accumulated on the interior of pocket type filter 400 can be easily measured by through display 412.

Accordingly, the drawback of the prior art which the pocket type filter should be separated from the filter case in order to read the amount of the fluff is dissolved. Moreover, since the fluff can be removed from the pocket type filter before the interior of the pocket type filter is fulled with the fluff, the capability of accumulating the fluff of the filter and the washing efficiency of a washing machine are increased.

Since the pocket type filter is secured in the filter receiving portion by locking part which is formed at the upper end of the front panel when the pocket type filter is inserted into the filter receiving portion of the filter case, the pocket type filter is prevented from separating from the filter case by the exterior forces such as the vibration and rotation of the dehydrating tub by the rotation of the pulsator and the collision of the laundry due to the vibration and rotation of the dehydrating tub.

While the present invention has been particularly shown and described with reference to particular embodiment thereof, it will be understood by those skilled in the art that various changes in form and details may be effected therein without departing from the spirit and scope of the invention as defined by the appended claims.

What is claimed is:

1. A filter apparatus for a washing machine comprising:

a filter case attached to an inner lower portion of a dehydrating tub of the washing machine for forming a predetermined space with the dehydrating tub, including an attachment portion for being attached to the dehydrating tub and a filter receiving portion formed with an opening portion; and a pocket filter including a front panel attached with a mesh net to one side thereof for filtering fluff intermingled in the washing water, a rear panel for forming a predetermined space with the front panel, said rear panel being coupled to the front panel by means of a hinge shaft for opening and/or closing said pocket filter, said rear panel further including a mesh net for filtering the fluff intermingled in the washing water, and a check valve fixed to the lower side of the rear panel for confining the flow of the washing water introduced into the space between the front panel and the rear panel, the pocket filter being inserted into the filter receiving portion and said front panel being made of a transparent material.

2. The filter apparatus for a washing machine as claimed in claim 1, wherein the pocket filter further comprises a display for displaying an amount of the fluff which is accumulated therein.

3. The filter apparatus for a washing machine as claimed in claim 2, wherein the display comprises a protrusion which is protruded from an inner side of the front panel to an inner side of the rear panel and/or from an inner side of the rear panel to an inner side of the front panel to be contact respectively therewith.

4. The filter apparatus for a washing machine as claimed in claim 1, wherein the pocket filter further comprises a locking means for preventing the pocket filter from releasing from the filter receiving portion.

5. A filter apparatus for a washing machine comprising:

a filter case attached to an inner lower portion of a dehydrating tub of the washing machine for forming a predetermined space with the dehydrating tub, including an attachment portion for being attached to the dehydrating tub and a filter receiving portion formed with an opening portion; and a pocket filter inserted into the filter receiving portion including a front panel attached with a mesh net to one side thereof for filtering fluff intermingled in the washing water, a rear panel for forming a predetermined space with the front panel by being coupled to the front panel by means of a hinge shaft for opening and/or closing of said pocket filter, said rear panel further including a mesh net for filtering the fluff intermingled in the washing water, a check valve fixed to the lower side of the rear panel for confining the flow of the washing water introduced into the space between the front panel and the rear panel, and a locking means for preventing the pocket filter from releasing from the filter receiving portion.

6. The filter apparatus for a washing machine as claimed in claim 5, wherein the locking means includes a push plate being formed at an upper end of the front panel and having an elasticity, and a locking protrusion being formed at an upper side of the push plate and locked to a locking jaw which is formed at an upper end of the filter receiving portion.

7. The filter apparatus for a washing machine as claimed in claim 6, wherein the filter receiving portion is provided with an aperture formed at the upper end of the filter receiving portion, whereby a finger pressing the push plate is inserted into the aperture.

* * * * *